United States Patent Office 3,480,083
Patented Nov. 25, 1969

3,480,083
WATERFLOOD PROCESS USING ORGANIC PHOSPHATE ESTERS
Donald C. Oleen, Houston, Tex., assignor to Nalco Chemical Company, Chicago, Ill., a corporation of Delaware
No Drawing. Filed Mar. 27, 1968, Ser. No. 716,312
Int. Cl. E21b *43/20, 43/22;* C09k *3/00*
U.S. Cl. 166—275   8 Claims

ABSTRACT OF THE DISCLOSURE

Certain organic phosphate esters are used in a waterflooding system in order to prevent scaling of equipment and plugging. These esters are introduced into one or more injection wells and will pass through the underground formation to a producing well or wells without being destroyed during such passage.

---

This invention relates to a method of treating water introduced into underground formations, and more particularly to a method of treating water which is forced into the producing formation in the secondary recovery of oil or in the disposal of waste water and brines from oil and gas wells.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the waterflooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well and the water is pumped into the injection well. Supplementary water from other sources may also be used in conjunction with the produced water. When the storage reservoir is open to the atmosphere and the oil is subject to aeration, this type of waterflooding system is referred to herein as an "open waterflooding system." If the water is recirculated in a closed system without substantial aeration, the secondary recovery method is referred to herein as a "closed waterflooding system."

The water which is introduced into the injection wells may vary considerably in composition from one field to another. Frequently it contains relatively large quantities of dissolved salts such as sodium chloride and therefore can be described as a brine. It may also contain other salts such as those of calcium, magnesium, barium and strontium. Some iron salts may likewise be present. In some cases these salts are added to a fresh water to prevent clay minerals from swelling and sealing off porous oil sands, but in most instances their occurrence is natural.

Some of the difficulties heretofore encountered in waterflooding operations are the plugging of surface equipment, injection wells and formation due to numerous factors but particularly because of the formation of insoluble salts in the system and on the face of the formation, the growth of microorganisms which form solids that tend to plug the equipment and formation and the corrosion of equipment used in the system with the attendant formation of products of corrosion which tend to plug the formation. The plugging of the formation makes it necessary to use increased pressures in order to force the water into the injection wells and this in turn greatly increases the cost of secondary oil recovery operations by waterflooding methods, making such methods impractical in many instances. The corrosion problem also makes it necessary to replace the equipment at frequent intervals thereby increasing the cost of the secondary oil recovery operation.

Inorganic polyphosphates have been added to water in waterflood systems in an effort to alleviate corrosion and scale formation.

The polyphosphates suffer from the objection that under the conditions present in an oil-bearing formation they can undergo reversion to orthophosphates which in turn form insoluble salts with calcium, magnesium, barium and strontium. Calcium and magnesium are usually present in substantial amounts in oil-bearing formations and barium and strontium salts are often present in smaller amounts. The formation of insoluble salts as previously indicated would tend to plug the oil-bearing strata and reduce the chances of obtaining an improvement in the recovery of the oil.

It would be desirable to provide a process in which a chemical is added to an injection well which will inhibit scaling of equipment and plugging of the well and will retain its identity while passing through the underground formation to the producing well or wells where it is also effective as a scale inhibitor. An object of this invention is to provide such a process.

In accordance with the invention it has been found that certain organic phosphate esters which are effective as scale inhibitors can be added to an injection well or wells in a waterflood system and will pass through the underground formation to a producing well or wells without being destroyed during such passage. Thus, protection is afforded against scale formation in the producing well or wells as well as the injection well or wells. This protection is especially useful in a number of areas where scaling of metal surfaces, particularly ferrous metal surfaces, by barium sulfate, calcium sulfate and/or calcium carbonate is a problem. By control of scale formation, breakdowns, maintenance, cleaning and repairs caused or necessitated by scale formation can be minimized.

The organic phosphate esters useful for the purpose of the invention are made by reacting phosphorus pentoxide, or polyphosphoric acid (e.g., 115% polyphosphoric acid), or mixtures thereof, with polyoxyalkylated polyhydric (polyhydroxy) compounds.

The preferred polyoxyalkylated polyhydric compounds are either oxyethylated or ovypropylated-terminally oxyethylated polyhydric compounds such as polyoxyethylated glycerol, sorbitol, mannitol or trimethylolpropane. Other compounds which may be either oxyethylated or oxypropylated-terminally oxyethylated for the purposes of this invention include erythritol, arabitol, xylitol, quercitol, inositol, and mono-, di-, or tri-pentaerythritol.

The polyoxyalkylated polyhydric compounds are phosphated by reaction with phosphorus pentoxide at elevated temperature in the order of about 95–150° C. The reaction time is preferably at least about 30 minutes. The reaction may be conducted longer, however, e.g., up to 3–5 hours, to assure complete reaction. If desired, a catalyst such as BF$_3$ etherate complex may be used.

The resultant reaction product may be used as is, or it may be converted to the alkali metal salt by partial to complete neutralization with an alkali metal base such as potassium or sodium hydroxide, potassium or sodium carbonate, and the like.

The polyhydroxy compounds contain at least one, and preferably an average of at least about two, 2-hydroxyethyl groups (—CH$_2$CH$_2$OH) provided by the oxyethylation. The primary hydroxyl groups thereof are more effective than the secondary hydroxyl groups which would be provided by oxypropylation

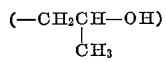

However, oxypropylation may be used if the oxypropylated product is then oxyethylated to provide terminal 2-hydroxyethyl groups.

The compositions of the invention comprise a phosphated polyhydroxy composition derived by the reaction of phosphorus pentoxide and a polyol composition of the formula $$(HO—)_xR[—O(R_1O—)_zCH_2CH_2OH]_y$$

wherein R is a saturated, hydrocarbon radical having 3–6 carbon atoms, R is a member selected from the group consisting of —CH$_2$CH$_2$— and

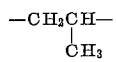

$x$ is a number average in the range of 0–5, inclusive, and the sum of $x$ plus $y$ equals 3–6, and $z$ is a number average in the range of 0–3, inclusive, said phosphated polyhydroxy compositions having an average of at least one and up to all of the hydroxyls of the 2-hydroxyethyl groups and on an average of zero up to substantially all of said hydroxyl groups directly attached to the radical R replaced by phosphate ester groups derived from said phosphorus pentoxide, said phosphate ester groups consisting essentially of one or both of a member selected from the group consisting of

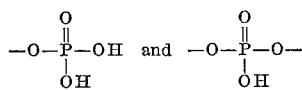

Also, the invention embraces the alkali metal salts thereof derived by the partial to complete neutralization of the phosphate ester groups with an alkali metal base.

Preferred embodiments include those in which said polyol composition is derived by oxyethylation of glycerol with 1.5 to 2.5 moles of ethylene oxide per mole of glycerol; those in which said polyol composition is derived by the oxyethylation of mannitol with about 2–20 moles of ethylene oxide per mole of mannitol; those in which said polyols are derived by the oxyethylation of sorbitol with about 2–20 moles of ethylene oxide per mole of sorbitol; and those in which said polyol is derived by the oxyethylation of trimethylolpropane with 1.5 to 2.5 moles of ethylene oxide per mole of trimethylolpropane.

The invention further embraces a process of the type describing utilizing a hardness-ion-precipitation-preventing quantity in the order of 0.5–100 parts per million of a phosphated polyhydroxy composition derived by the reaction of phosphorus pentoxide and/or polyphosphoric acid and a polyol composition of the formula $$(HO—)_xR[—O(R_{10}O—)_zCH_2CH_2OH]_y$$

wherein R is saturated hydrocarbon radical having 3–6 carbon atoms, R$_1$ is a member selected from the group consisting of —CH$_2$CH$_2$— and

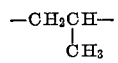

$x$ is a number in the range of 0–5 inclusive, $y$ is a number average in the range of 1–6, inclusive, and the sum of $x$ plus $y$ equals 3–6, and $z$ is a number average in the range of 0–3, inclusive, said phosphated polyhydroxy compositions having an average of at least one and up to all of the hydroxyls of the 2-hydroxyethyl groups and on an average of zero up to substantially all of said hydroxyl groups directly attached to the radical R replaced by phosphate ester groups derived from said phosphorus pentoxide, said phosphate ester groups consisting essentially of one or both of a member selected from the group consisting of

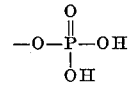

and

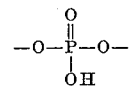

The process also includes use of alkali metal salts derived by partial to complete neutralization of the phosphate ester groups with an alkali metal base.

The following examples illustrate the preparation of phosphate esters suitable for the practice of the invention.

Example 1

Glycerine and finely ground potassium hydroxide are charged into an oxyalkylation reactor and are heated to 150° C. while purging the reactor with natural gas. Ethylene oxide is added slowly at 150–160° C. until the weight amount of added ethylene oxide equals the weight of the glycerine. The reactor contents are recycled for an additional hour after all the ethylene oxide is added to assure essentially complete oxyalkylation. The weight of the added KOH was about 0.1% of the total weight of glycerine and ethylene oxide.

The phosphating procedure comprises charging 550 parts of the above polyoxyethylated glycerine and 115 parts of n-propanol, the latter as a viscosity control agent, into a vessel free from moisture and oily or other foreign material. The charge is heated to 50° C., whereupon 456 parts of phosphorous pentoxide is added in small amounts whereby the exothermic reaction is controled by the rate of addition and by cooling to maintain a temperature of 80–90° C. When 360 parts of P$_2$O$_5$ has been added, the temperature is allowed to increase to the range of 130–135° C. for about 2 hours, or less if the clarity of the reaction mass indicates complete reaction.

With the reactor on full cooling, 1830 parts of tap water is added, slowly in the initial phase of water addition. Cooling is continued, and when the temperature is below 60° C., 6 parts of sodium molybdate (a corrosion inhibitor) and 240 parts of flake caustic are added. The temperature is maintained below 90° C. during flake caustic addition.

Then 20 parts of a sulfonated tannin, which is commercially available under the trademark Rayflo, 286 parts of n-propanol and 215 parts of methanol are added and the mass is stirred until uniform. The final pH is adjusted to a value between 4.0 and 4.5.

Examples of further oxyethylated polyhydric compounds which can be obtained by the oxyalkylation procedure of Example 1 and can be phosphated as therein described are as follows:

TABLE 1.—Oxyalkylated Compounds

| Example: | Polyhydric compound | Parts | Parts ethylene oxide |
|---|---|---|---|
| 2 | Glycerine | 410 | 390 |
| 3 | do | 276 | 524 |
| 4 | do | 234 | 670 |
| 5 | do | 590 | 111 |
| 6 | do | 320 | 920 |
| 7 [1] | Trimethylolpropane | 930 | 653 |
| 8 | Sorbitol | 250 | 550 |
| 9 | do | 220 | 960 |
| 10 [2] | Mannitol | 266 | 113 |
| 11 | do | 234 | 234 |
| 12 | Glycerine | 200 | 200 |

[1] Catalyst-BF$_3$ etherate complex.
[2] Solvent, dioxane.

Table 2.—Phosphated Oxyalkylated Compounds

| Oxyalkylated compound | | Parts $P_2O_5$ | Reaction Time After $P_2O_5$ Addition, hr. | Temp., 0° C. | Parts Water Added | Parts Flake Caustic | Parts Alkanol Added After Rxn. |
|---|---|---|---|---|---|---|---|
| Ex. | Parts | | | | | | |
| Example: | | | | | | | |
| 13 | 2 | 200 | 120 | 3 | 140 | 320 | 0 | 0 |
| 14 | 2 | 200 | 120 | 3 | 140 | 383 | 32 | [7] 32 |
| 15 | 2 | 200 | 60 | 0.75 | 100–110 | 335 | 45 | 0 |
| 16 | 2 | 200 | [1] 60 | 0.50–0.75 | 100–110 | 335 | 45 | 0 |
| 17 | 2 | 200 | [1] 100 | | | 305 | 60 | 0 |
| 18 | 2 | 200 | [1] 100 | | | 360 | 70 | 0 |
| 19 | 2 | 200 | [1] 120 | | | 600 | 60 | 0 |
| 20 | 6 | 300 | [2] 100 | | | 560 | 0 | 0 |
| 21 | 2 | 150 | [5] 60 | 0.50 | 190 | 390 | Note 1 | 0 |
| 22 | 2 | 150 | [3] 120 | 2–3 | 120 | 510 | Note 1 | 0 |
| 23 | 6 | 150 | [3] 140 | 1 | 100 | 470 | Note 1 | 0 |
| 24 | 2 | 150 | 90 | 0.50 | 185 | 450 | Note 1 | 0 |
| 25 | 2 | 150 | [6] 90 | 0.50 | 180 | 450 | Note 1 | 0 |
| 26 | 12 | 150 | [4] 130 | 0.50 | 150 | 540 | Note 1 | [8] 20 |
| 27 | 12 | 150 | [4] 130 | 0.50 | 185 | 540 | Note 1 | [8] 20 |
| 28 | 12 | 150 | [1] 70 | ([9]) | 120 | 410 | Note 1 | [8] 50 |
| 29 | 12 | 150 | [5] 90 | 0.5 | 100–110 | 495 | Note 1 | 0 |
| 30 | 7 | 930 | 50 | 5 | 100 | 200 | 0 | 0 |
| 31 | 7 | 930 | 90 | 5 | 100 | 200 | 0 | 0 |
| 32 | 8 | 200 | 10 | 3 | 90–100 | 200 | 0 | 0 |
| 33 | 9 | 200 | 20 | 3 | 90–100 | 200 | 0 | 0 |
| 34 | 8 | 200 | [6] 110 | 3 | 100 | 310 | 0 | 0 |
| 35 | 10 | 200 | 90 | 3 | 108 | 290 | 0 | 0 |
| 36 | 11 | 200 | [1] 90 | 3 | 108 | 290 | 0 | 0 |
| 37 | 11 | 200 | 90 | 3 | 108 | 290 | 0 | 0 |

[1] 2.5 cc. $BF_3$.
[2] 3 cc. $BF_3$.
[3] 50 parts n-propanol added before $P_2O_5$.
[4] 30 parts n-propanol added before $P_2O_5$.
[5] 20 parts dioxane added before $P_2O_5$.
[6] 5 parts flake caustic soda added with $P_2O_5$.
[7] Methanol.
[8] n-propanol.
[9] To completion.

NOTE: 1.—Sufficient to neutralize.

Example 38

In a reaction vessel equipped with a stirrer and cooling means, 150 parts of the oxyethylated glycerol of Example 2 and 30 parts of n-propanol are held at a temperature below 125–130° C. while adding 130 parts $P_2O_5$. When the reaction mass becomes clear, it is cooled. To the cooled product is added 20 parts n-propanol and 540 parts water, and then the product is neutralized with flake caustic.

Example 39

In a reaction vessel equipped with cooling means and a stirrer, 150 parts of the oxyethylated glycerol of Example 12 and 150 parts of dioxane, as solvent, are held by cooling at a temperature below 100° C. while adding 90 parts $P_2O_5$. The temperature is then raised and 127 parts dioxane is distilled off. After cooling, the reaction product is diluted with 525 parts water and is neutralized with flake caustic soda.

Example 40

The solution of Example 39 (880 parts) is blended with 100 parts methanol and 20 parts of a sulfonated tannin as described in Example 38.

Lower alkanols, particularly n-propanol, may be present in the $P_2O_5$ reaction as viscosity control agents. Lower alkanol phosphates which form by the reaction of the alkanol and $P_2O_5$ are not particularly active as scale inhibitors.

The following example illustrates the practical application of the invention.

Example 41

The composition of Example 1 was injected into the water of an injection well in a quantity of ten parts per million parts of water in a West Texas oil field where an injection well was spaced about 200 to 300 yards from each of four producing wells. The floodwater was forced from the injection well to the producing wells. The scale inhibiting phosphate ester was carried along under ground to the producing wells and afforded protection to the equipment in the injection well and the producing wells while also inhibiting underground plugging.

The compositions of Examples 2 to 40 can be similarly employed.

The arrangement of injection and producing wells can be varied. Thus, a line drive arrangement can be used, or a single injection well and either 6 or 8 surrounding producing wells, or a plurality of injection wells around one or more producing wells.

So much of this application as relates to the organic phosphate esters and their preparation is described in United States application Ser. No. 559,723 filed June 23, 1966, and does not form a part of this invention. Nor is this invention concerned with general uses of the type described and claimed in said application.

The invention is hereby claimed as follows:

1. In a waterflood system in which water is added to one or more injection wells in order to force oil from underground formations to one or more producing wells, the process which comprises introducing a scale inhibiting amount of an organic phosphate ester into at least one injection well and forcing said ester through the underground formation to at least one producing well, said ester being obtained by reacting a substance from the class consisting of phosphorus pentoxide, polyphosphoric acid, and mixtures thereof, with a polyoxyalkylated polyhydroxy compound having the formula

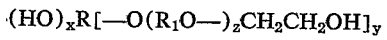

wherein R is a saturated hydrocarbon radical having 3–6 carbon atoms, $R_1$ is a member selected from the group consisting of —$CH_2CH_2$— and

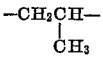

$x$ is a number average in the range of 0–5 inclusive, $y$ is a number average in the range of 1–6 inclusive, and the sum of $x$ plus $y$ equals 3–6, and $z$ is a number average in the range of 0–3 inclusive, said phosphated polyhydroxy compositions having an average of at least one and up to all of the hydroxyls of the 2-hydroxyethyl groups and on an average of zero up to substantially all of said hydroxyl groups directly attached to the radical R replaced by phosphate ester groups, said phosphate ester groups consisting essentially of one or both of a member selected grom the group consisting of

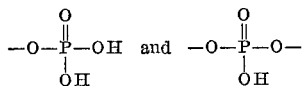

2. A process as claimed in claim 1 in which said phosphate ester has been at least partially neutralized to form a salt.

3. A process as claimed in claim 1 in which the amount of said phosphate ester is within the range of 0.5 to 100 parts per million parts by weight of water.

4. A process as claimed in claim 1 in which said polyoxyalkylated polyhydroxy compound is obtained by oxyethylating glycerine with 1.5 to 2.5 moles of ethylene oxide per mole of glycerine.

5. A process as claimed in claim 1 in which said polyoxyalklated polyhydroxy compound is obtained by oxyethylating mannitol with about 2–20 moles of ethylene oxide per mole of mannitol.

6. A process as claimed in claim 1 in which said polyoxyalkylated polyhydroxy compound is obtained by oxyethylating sorbitol with about 2–20 moles of ethylene oxide per mole of sorbitol.

7. A process as claimed in claim 1 in which said polyoxyalkylated polyhydroxy compound is obtained by oxyethylating trimethylolpropane with 1.5 to 2.5 moles of ethylene oxide per mole of trimethylolpropane.

8. A process as claimed in claim 1 in which said phosphate ester is obtained by the reaction of phosphorus pentoxide and a polyol composition of the formula $$(\text{HO}-)_x R[-O(R_1O-)_z CH_2CH_2OH]_y$$

wherein R is a saturated, hydrocarbon radical having 3–6 carbon atoms, $R_1$ is a member selected from the group consisting of $-CH_2CH_2-$ and

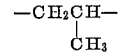

$x$ is a number average in the range of 0–5 inclusive, $y$ is a number average in the range of 1–6 inclusive, and the sum of $x$ plus $y$ equals 3–6, and $z$ is a number average in the range of 0–3, inclusive, said phosphated polyhydroxy compositions having an average of at least one and up to all of the hydroxyls of the 2-hydroxyethyl groups and on an average of zero up to substantially all of said hydroxyl groups directly attached to the radical R replaced by phosphate ester groups derived from said phosphorus pentoxide, said phosphate ester groups consisting essentially of one or both of a member selected from the group consisting of

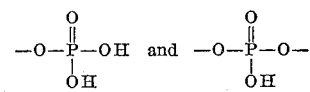

References Cited

UNITED STATES PATENTS

| 2,246,726 | 6/1941 | Garrison | 166—305 |
| 3,032,500 | 5/1962 | Milks et al. | 252—8.55 |
| 3,033,889 | 5/1962 | Chiddix et al. | 252—8.55 X |
| 3,191,676 | 6/1965 | Froning | 166—275 |
| 3,258,071 | 6/1966 | Yu Shen et al. | 252—8.55 X |
| 3,378,489 | 4/1968 | Lasater | 166—305 X |

STEPHEN J. NOVOSAD, Primary Examiner

U.S. Cl. X.R.

252—8.55

PO-1050
(5/69)

UNITED STATES PATENT OFFICE
CERTIFICATE OF CORRECTION

Patent No. 3,480,083      Dated November 25, 1969

Inventor(s)    Donald C. Oleen

It is certified that error appears in the above-identified patent and that said Letters Patent are hereby corrected as shown below:

Column 2, line 48, "ovypropylated" should read --oxypropylated--.

Column 3, line 15, "R" should read --$R_1$--.

Column 7, line 2, "grom" should read --from--.

SIGNED AND
SEALED
FEB 24 1970

(SEAL)
Attest:

Edward M. Fletcher, Jr.
Attesting Officer

WILLIAM E. SCHUYLER, JR.
Commissioner of Patents